Aug. 11, 1964  R. LEE  3,144,597
SINGLE PHASE ALTERNATING CURRENT MOTOR SYSTEM
Filed June 2, 1960

INVENTOR.
ROYAL LEE
BY
Christopher L. Waal
ATTORNEY

United States Patent Office 3,144,597
Patented Aug. 11, 1964

3,144,597
SINGLE PHASE ALTERNATING CURRENT
MOTOR SYSTEM
Royal Lee, Elm Grove, Wis., assignor to Lee Foundation for Nutritional Research, Milwaukee, Wis., a corporation of Wisconsin
Filed June 2, 1960, Ser. No. 33,414
5 Claims. (Cl. 318—220)

This invention relates to alternating current motors and to systems including the same.

An object of the invention is to provide an improved alternating current motor of efficient and compact construction for use with apparatus to be served or driven thereby, the motor being relatively quiet in operation and adapted to be mounted in a limited or confined space of the served apparatus.

Another object is to provide a single-phase motor system in which the served or driven apparatus includes a resistive utilization element, such as a projection lamp or heating element, this element also forming a phase-shifting or dephasing element for the motor circuit. The system of the invention is particularly useful in the case of an optical projector, such as of the motion picture, slide, or film type, in which the projection lamp is adapted to be cooled by air moving means driven by the motor. The invention is also applicable to other motor-operated apparatus, such as electric hair dryers and hand dryers, having resistive utilization elements.

A further object is to provide a single-phase motor system in which the lamp or other resistive utilization element of the served apparatus may be deenergized at will while the motor remains in operation.

A still further object is to provide a motor system in which the resistive utilization element of the served apparatus will be automatically reconnected in circuit with the motor when the motor is stopped, so as to insure proper restarting of the motor.

The invention further consists in the several features hereinafter described and claimed.

In the accompanying drawing.

Figure 1:
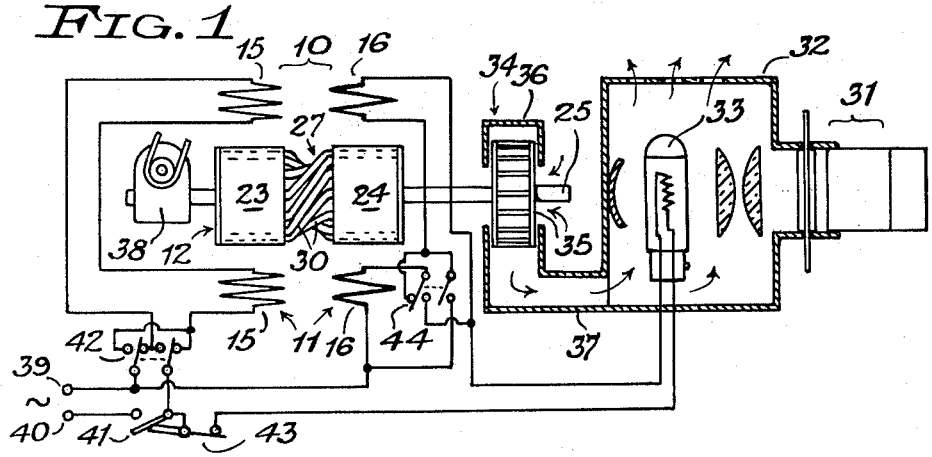
FIG. 1 is a schematic diagram of an electric motor system of the invention including a single-phase induction motor and a cooperating utilization apparatus in the form of an optical projector.

In the drawing, the numeral 10 designates generally a single-phase induction motor comprising a stator 11 and a cooperating rotor 12, the motor being of a single-phase type.

The stator 11 comprises a pair of tandem coaxial stator core members 13 and 14 carrying respective two-section phase windings 15 and 16. The two stator core members are of identical construction and are axially spaced, and each consists of a pair of opposed laminated U-shaped half-sections 17, FIG. 3, each including a yoke 18 and tapered divergent legs 19. The complementary core sections have their ends in confronting relation, thus forming an elongated loop. The core yokes 18 at opposite ends of the loop-shaped core are parallel, and the core legs define a two-pole rotor tunnel midway between the yokes. The yokes of the stator core member 13 carry the two coils or sections of the phase winding 15, and the yokes of the stator core member 14 carry the two coils or sections of the phase winding 16. Each stator core member, per se, is similar to the one disclosed in my United States Patent No. 2,406,389 for Electric Motor, issued August 27, 1946.

Figure 3:
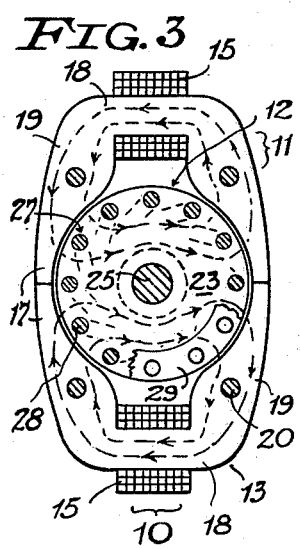
FIG. 3 is a transverse sectional view of the motor, taken generally on the line 3—3 of FIG. 2, magnetic flux paths being shown in broken lines.

The two phase winding sections on each stator core member are so poled as to produce an alternating field flux passing horizontally through the rotor, as viewed in FIG. 3, the polar axis extending centrally through the rotor in the plane of the confronting ends of the U-shaped core sections. The width of each loop-shaped stator core member is only slightly greater than the diameter of the rotor, as seen in FIG. 3. The two tandem stator core members are placed in alignment with their polar axes lying in coplanar relation, so that the stator structure is relatively narrow, as viewed in FIG. 3, and can be accommodated in a confined or limited space. The stator core members are suitably retained in their axially spaced position as by stud bolts 20 passing through the core members in parallel relation to the rotor axis and rigidly secured to end plates 21, the core members being separated by non-magnetic spacers 22.

The two stator windings 15 and 16 are energized in out-of-phase relation, as hereinafter described. The stator winding 15 has a substantially higher impedance than the stator winding 16, and the two coils forming each stator winding are here shown to be connected in series. However, in some instances, the two coils of each stator winding may be connected in parallel.

The rotor 12 comprises a pair of laminated rotor core members or sections 23 and 24 of cylindrical shape disposed in tandem coaxial relation and mounted on a common shaft 25. The rotor core members are disposed within the respective stator core members 13 and 14, and the shaft is journalled in the stator end plates 21. The rotor core members are axially spaced and are separated by a non-magnetic spacer sleeve 26 on the rotor shaft. The rotor carries a squirrel-cage winding 27 common to both rotor core members and consisting of conductor bars 28 connected to end rings 29 disposed at the remote ends of the rotor core assembly. In the present instance, the conductor or rotor bars 28 have intermediate portions 30 which are disposed between the spaced rotor core members and are skewed through a suitable angle, which may vary from about 30° to 90°, the skew angle being the same for all of the rotor bars. The active offset portions of the rotor bars 28 in the rotor core members extend substantially parallel to the rotor shaft. For a reversible motor, a 90° displacement of each rotor bar may be provided.

The induction motor 10 is here shown to serve a motion picture projector 31 including a lamp house 32 having therein an air-cooled projection lamp 33. A blower 34 is provided for cooling the lamp and comprises a blower rotor 35 rotatable in a blower housing 36. The blower rotor is drivingly connected to the motor shaft, as by mounting the rotor on the shaft, and the blower housing has its discharge portion 37 communicating with the lamp house for passing cooling air over the lamp and adjacent parts. If desired, the blower may be arranged to draw air through the lamp house, as is well understood in this art. The motor also drives suitable transmission gearing 38 for operating projector mechanism, not shown. In the case of a manually fed slide projector, the transmission gearing is not required.

The motor and projection lamp are connected to line conductors 39, 40 of a single-phase power source through a control switch or "on-off" switch 41 in the line conductor 40. The main phase winding 15 of the motor is connected directly across the line through the control switch 41 and also through a reversing switch 42 in the case of a reversible motor. One terminal of the low-impedance phase winding 16 is connected to the line conductor 39. The other terminal of the phase winding is connected to the projection lamp, which forms a resistive phase-shifting or dephasing element for this winding, and the other terminal of the lamp is connected to a lamp switch 43 in series with the control switch 41, so as to energize the lamp and connected phase winding 16 when both switches are closed. The low-impedance phase winding circuit also includes a switch 44 for connecting the two coil sections thereof either in series, as shown, or in parallel, so as to suit lamps of different wattage rating. When the control switch 41 is open, as seen in FIG. 1, this switch holds the lamp switch 43 in closed position so that upon closure of the control switch both phase windings of the motor will be energized to start the motor, and when the control switch is opened the lamp switch 43, if in open position, will be restored to closed position ready for a subsequent starting of the motor.

The projection lamp 33 may have a substantial power rating, for example 500 or 1000 watts, whereas the power rating of the motor may be relatively low, for example 50 or 100 watts. Accordingly, the stator winding 16 of the motor will carry the relatively high normal lamp current, but has only a few turns of relatively heavy wire and presents a relatively low impedance compared with the impedance of this stator winding. By way of example, about 95% of the line voltage may appear across the projection lamp, and 5% of the line voltage may appear across the series-connected stator winding 16. The combined impedance of this stator winding and lamp is also considerably lower than the impedance of the stator winding 15. The extent of the skew or angular offset of the rotor bars 28 is selected to provide optimum operating conditions for any given lamp resistance. The ampere-turns in the two phase windings may be approximately equal.

In operation, the projector motor is started by closing the control switch 41, thus energizing both stator or phase windings 15 and 16 and the projection lamp 33, the latter being connected in series with the stator winding 16 and the normally closed lamp switch 43 and forming a phase-shifting element for this winding. The out-of-phase currents flowing through the stator windings produce a rotating magnetic flux in the stator core assembly which sweeps through the rotor core assembly and induces currents in the angularly offset conductor bars 28 of the squirrel-cage rotor winding 27, the rotor currents reacting with the field flux to effect rotation of the rotor. The projection lamp and other adjacent parts in the lamp house are cooled by air currents produced by the motor-driven blower 34. With the projector in normal operation, both stator windings 15 and 16 remain energized, but in time-spaced relation, and the projection lamp remains lighted by reason of its series connection with the stator winding 16.

It is sometimes desirable to extinguish the projection lamp, as during adjustment or manipulation of the projector or film, or rewinding of the film. This is effected by opening the lamp switch 43, which also opens the circuit through the stator winding 16 connected in series with the lamp. However, the other stator winding 15 remains energized and the motor continues to run, driving the blower to pass cooling air through the lamp house, and also driving the projector mechanism if this is required. Subsequent closing of the lamp switch 43 will reenergize the lamp and the series-connected stator winding 16. Upon opening of the control switch 41, the motor will stop and the lamp will be extinguished. If at this time the lamp switch 43 is in open position, it will automatically be restored to closed position by the opening of the control switch so that the motor may be restarted with both stator windings in circuit.

Figure 2:
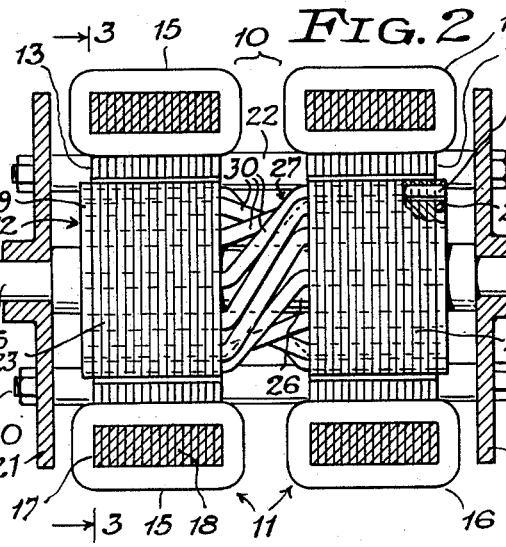
FIG. 2 is a longitudinal sectional view of the motor.
Figure 4:
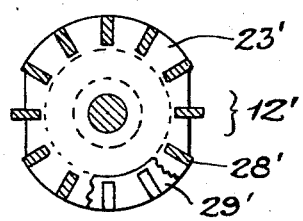
FIG. 4 is a detail transverse sectional view of a modified form of rotor for converting the motor to a synchronous-induction type.

In some instances, it is necessary or desirable to drive the projector with a synchronous motor. In such case the motor rotor of FIGS. 2 and 3 may be replaced by a different type of rotor such as the rotor 12' shown in FIG. 4, the stator assembly remaining unchanged. The rotor 12' will convert the motor to one of the synchronous-induction type, the motor starting as an induction motor but running as a non-excited synchronous motor. The rotor 12' of FIG. 4 has magnetic material removed from opposite sides of one or both of the rotor core sections, a rotor core section 23' being shown. If both rotor core sections are thus shaped, these core sections are angularly displaced to correspond with the skew of the rotor bars. The rotor 12' is provided with strap-type conductor bars 28' connected to end rings 29', one being shown. The rotor of FIG. 4 is otherwise the same as that of FIGS. 2 and 3.

While the invention is shown to be embodied in a motor-driven optical projector, certain features thereof are also applicable to other motor-driven apparatus, such as hair dryers and hand dryers, having resistive utilization or heating elements of substantial wattage ratings.

I claim:

1. In combination, an alternating current motor having cooperating stator and rotor members and including a pair of phase windings adapted for energization from a single-phase current source, a utilization device served by said motor and including a resistive utilization member connected in series with one of said phase windings and forming a phase-shifting element for the connected phase winding, switch means for opening the circuit through said utilization member at will while the motor is running, and means for insuring a closed condition of said switch means when the motor is restarted from rest.

2. In combination, an alternating current motor having cooperating stator and rotor members and including a pair of phase windings adapted for energization from a single-phase current source, an optical projector including a projection lamp connected in series with one of said phase windings and forming a phase-shifting element for the connected phase winding, switch means for opening the circuit through the lamp at will while the motor is running, and means for insuring a closed condition of said switch means when the motor is restarted from rest.

3. In combination, an alternating current motor having cooperating stator and rotor members and including a pair of phase windings adapted for energization from a single-phase current source, an optical projector including a projection lamp connected in series with one of said phase windings and forming a phase-shifting element for the connected phase winding, switch means for opening the circuit through the lamp at will while the motor is running, and means for insuring energization of both of said phase windings during starting of the motor.

4. In combination, an alternating current motor having cooperating stator and rotor members and including a pair of phase windings adapted for energization from a single-phase current source, and a utilization device served by said motor and including a resistive utilization member connected in series with one of said phase windings and forming a phase-shifting element for the connected phase winding, said last-named phase winding including winding sections selectively connected in series and parallel to change the impedance of said winding.

5. In combination, an alternating current motor having cooperating stator and rotor members and including a pair of phase windings adapted for energization from a single-phase current source, a lamp connected in series with one of said phase windings and forming a phase-shifting element for the connected phase winding, and switch means including a motor switch and a lamp switch having an actuating connection with said motor switch, said motor switch when closed permitting operation of the lamp switch to open and closed positions to control energization of said lamp, said motor switch when opened from closed position actuating said lamp switch, if the latter is open, to closed position and preventing opening of said lamp switch while said motor switch remains open, whereby to insure starting of the motor with both phase windings energized.

References Cited in the file of this patent

UNITED STATES PATENTS

| | | |
|---|---|---|
| 1,966,531 | Nemeth | July 17, 1934 |
| 2,224,422 | Ballman | Dec. 10, 1940 |
| 2,288,462 | Kent | June 30, 1942 |
| 2,449,713 | Tint | Sept. 21, 1948 |
| 2,507,399 | Christensen | May 9, 1950 |
| 2,901,645 | Sulger | Aug. 25, 1959 |